US008645241B2

(12) United States Patent  
Rodriguez et al.

(10) Patent No.: US 8,645,241 B2
(45) Date of Patent: Feb. 4, 2014

(54) E-CHECK AND E-COMMERCE (75) Inventors: Herman Rodriguez, Austin, TX (US); Newton James Smith, Austin, TX (US); Clifford Jay Spinac, Austin, TX (US)

(73) Assignee: Toshiba Global Commerce Solutions Holding Corporation, Tokyo (JP)

( * ) Notice: Subject to any disclaimer, the term of this patent is extended or adjusted under 35 U.S.C. 154(b) by 1319 days.

(21) Appl. No.: 10/733,837

(22) Filed: Dec. 11, 2003

(65) Prior Publication Data

US 2005/0131820 A1 Jun. 16, 2005

(51) Int. Cl.
*G06Q 40/00* (2012.01)

(52) U.S. Cl.
USPC ................................. 705/35; 705/38; 705/39

(58) Field of Classification Search
USPC .................. 705/39, 35, 40, 44, 17, 41, 64, 42
See application file for complete search history.

(56) References Cited

U.S. PATENT DOCUMENTS

| 5,010,485 | A | 4/1991 | Bigari |
| 5,432,506 | A | 7/1995 | Chapman |
| 5,484,988 | A | 1/1996 | Hills et al. |
| 5,925,865 | A | 7/1999 | Steger |
| 6,036,344 | A | 3/2000 | Goldenberg |
| 6,164,528 | A | 12/2000 | Hills et al. |
| 6,170,744 | B1 | 1/2001 | Lee et al. |
| 6,282,523 | B1 | 8/2001 | Tedesco et al. |
| 6,283,366 | B1 | 9/2001 | Hills et al. |
| 6,349,132 | B1 | 2/2002 | Wesemann et al. |
| 6,354,491 | B2 | 3/2002 | Nichols et al. |
| 6,487,540 | B1 | 11/2002 | Smith et al. |
| 7,051,206 | B1 | 5/2006 | Giest et al. |
| 7,089,208 | B1 | 8/2006 | Levchin et al. |
| 7,349,566 | B2 * | 3/2008 | Jones et al. ................... 382/139 |
| 2001/0023402 | A1 | 9/2001 | Flynn |
| 2001/0034609 | A1 | 10/2001 | Dovolis |
| 2002/0152137 | A1 | 10/2002 | Lindquist et al. |
| 2002/0156683 | A1 | 10/2002 | Stoutenburg et al. |
| 2002/0156688 | A1 | 10/2002 | Horn et al. |
| 2002/0174334 | A1 | 11/2002 | Meadow et al. |
| 2002/0178112 | A1 * | 11/2002 | Goeller et al. .................. 705/39 |

(Continued)

FOREIGN PATENT DOCUMENTS

WO WO 2008/086630 A1 7/2008

OTHER PUBLICATIONS

Response to Office Action filed Jul. 20, 2011, U.S. Appl. No. 12/052,676, 6 pages.

(Continued)

*Primary Examiner* — Ojo O Oyebisi
(74) *Attorney, Agent, or Firm* — Stephen R. Tkacs; Stephen J. Walder, Jr.

(57) ABSTRACT

Methods, systems, and media for processing and clearing a check are disclosed. Embodiments include hardware and/or software for generating an e-check in response to receipt of a paper check, by which a merchant performs the manual data entry for the merchant, the merchant's bank, the Federal Reserve Bank, and the purchaser's bank clearing procedures. The paper check is electronically scanned at the point of sale (POS) terminal to create a check object (the 'e-check') that contains the binary data of the check information, a scanned image of the paper check, and identification data from the purchaser. Then, the check object is submitted to the check writer's, or purchaser's bank, for automated clearing without having to process the physical document any further.

30 Claims, 4 Drawing Sheets

(56) References Cited

U.S. PATENT DOCUMENTS

| | | |
|---|---|---|
| 2003/0014368 A1 | 1/2003 | Leurig et al. |
| 2003/0061104 A1 | 3/2003 | Thomson et al. |
| 2003/0158819 A1 | 8/2003 | Scott |
| 2003/0217005 A1* | 11/2003 | Drummond et al. ............ 705/43 |
| 2003/0225705 A1* | 12/2003 | Park et al. ....................... 705/64 |
| 2005/0131768 A1 | 6/2005 | Rodriguez et al. |
| 2005/0131834 A1 | 6/2005 | Rodriguez et al. |
| 2005/0240482 A1 | 10/2005 | Ohkawa et al. |
| 2007/0061223 A1 | 3/2007 | Rodriguez et al. |
| 2008/0167972 A1 | 7/2008 | Rodriguez et al. |

OTHER PUBLICATIONS

Notice of Allowance mailed Aug. 4, 2011 for U.S. Appl. No. 12/052,676; 9 pages.
U.S. Appl. No. 10/733,836, 3 pages.
U.S. Appl. No. 10/733,838, 2 pages.
U.S. Appl. No. 11/559,593, 2 pages.
U.S. Appl. No. 12/052,676, 1 page.

* cited by examiner

E-CHECK AND E-COMMERCE

CROSS-REFERENCES TO RELATED APPLICATIONS

This application is related to U.S. patent application Ser. No. 10/733,838, entitled "E-COMMERCE BY CHECK", filed on the same day, the disclosure of which is incorporated herein in its entirety for all purposes.

This application is related to U.S. patent application Ser. No. 10/733,836, entitled "E-COMMERCE TRANSACTION AGGREGATION AND PROCESSING", filed on the same day, the disclosure of which is incorporated herein in its entirety for all purposes.

FIELD OF INVENTION

The present invention is in the field of e-commerce. More particularly, the present invention relates to methods, systems, and media to process and clear checks via a check object, referred to as an "e-check", generated at a point of sale (POS) terminal.

BACKGROUND

Current business processes for Point of Sale (POS) accept various forms of payment for merchandise such as checks, credit cards, debit cards, or cash. For example, a customer may purchase a product with a credit card from a merchant at the merchant's store or electronically via the merchant's web site. The merchant will process the credit card payment, electronically communicating with the credit card company to verify that the credit card company is willing to pay the amount of currency described by the merchant for the transaction. Once the transaction is authorized, an approval code is provided to the merchant and the merchant completes the transaction by providing the customer with a receipt that includes the product and some description to identify the form of payment like the credit card utilized for payment.

Unlike credit card, debit card, and cash transactions, however, transactions in which the purchaser pays for merchandise by check involve an additional delay in processing, which is referred to as a 'float' period. The delay is disadvantageous for both the merchant and the merchant's bank and involves duplicative efforts by the parties. More specifically, processing and clearing a check currently takes about 36-72 hours from the time a check is written until it is actually paid out of the purchaser's account. One of the reasons for the delay is that the paper checks must be sent to a check clearinghouse like the Federal Reserve Bank/Clearinghouse where the amount of the check is manually entered and printed on the bottom right edge of the check. Then, the check is sent to the bank of the purchaser where the check is sorted, scanned, recorded for the monthly statement, and the money is finally deducted from the account. Thus, the purchaser gets the advantage of the 36-72 hour 'float' period because the purchaser receives goods, services, cash, etc., while the actual money represented by the check remains in the purchaser's checking account, drawing interest.

The merchant's bank is disadvantaged because the merchant's bank will show the balance of the check in the merchant's bank account for the 'float' period. Further, the merchant is disadvantaged because the merchant will not know during the delay, possibly for several days, whether the check is actually good, i.e., whether the purchaser actually has sufficient funds available for the transaction, and, even if the purchaser does have the funds available, the funds that show in the merchant's account may be placed on hold by the merchant's bank until they are actually received or for some standard number of days to make sure that the funds are received before being available to the merchant.

Merchants who accept payment by check at the point of sale usually run the check through the point-of-sale (POS) terminal in order to request service from the check clearinghouse and to print certain merchant information on the back of the check. In the case where the check is accepted by the merchant, the current technology requires substantially manual data entry of the purchase amount into the POS terminal by the cashier; the purchaser's identification, such as a driver's license number and sometimes telephone number by the cashier; and the merchant's account information for depositing the check in the merchant's account.

Once the check is accepted, the merchant collects the checks received throughout a given period, usually a day, and deposits these checks at the merchant's bank. Then, the bank and the check clearinghouse will process the check information as one of the steps in clearing the check. This is typically a manual process involving keying in and printing on the check (using Magnetic Ink Character Recognition 'MICR' such as an E-13B font with 14 characters), the amount of the check, duplicating the efforts of the cashier.

After the merchant, merchant's bank, check clearinghouse, and purchaser's bank process the check, the purchaser finally receives the cancelled check or a scanned image of the check. In situations wherein the purchaser's bank supplies the purchaser with a scanned image of the check, the purchaser's bank generally provides the scanned image to the purchaser as hardcopy or on the Internet.

SUMMARY OF THE INVENTION

The problems identified above are in large part addressed by methods, systems, and media to process and clear a check. One embodiment provides a method for generating an e-check. The method generally includes scanning a check to create an image of the check in response to receiving a check as payment for a transaction; entering an amount of currency represented by the check into a point of sale terminal; identifying check information that describes a bank and a bank account, wherein the check comprises the check information; and generating a check object based upon the image, the amount, and the check information.

Another embodiment provides a method for transacting with an e-check. The method generally includes generating the e-check based upon a check, to substitute for a check as payment for a transaction; transmitting the e-check to a bank, wherein the bank is identified by a routing number on the check; and receiving a response to transmission of the e-check from the bank, the response to clear the check when sufficient funds are available for the transaction from an account associated with the e-check.

Some embodiments provide an apparatus for generating an e-check. The apparatus contemplates an image scanner to create an image of a check in response to receiving the check as payment for a transaction; an input device to input an amount of currency represented by the check; a character scanner to scan the check to identify check information that describes a bank and a bank account; and an e-check generator to generate a check object based upon the image, the amount, and the check information.

A further embodiment provides a machine-accessible medium containing instructions, which when executed by a machine, cause said machine to perform operations. The operations can involve scanning a check to create an image of the check in response to receiving a check as payment for a transaction; entering an amount of currency represented by the check into a point of sale terminal; identifying check information that describes a bank and a bank account, wherein the check comprises the check information; and generating a check object based upon the image, the amount, and the check information.

BRIEF DESCRIPTION OF THE DRAWINGS

Other objects and advantages of the invention will become apparent upon reading the following detailed description and upon reference to the accompanying drawings in which, like references may indicate similar elements.

DETAILED DESCRIPTION OF EMBODIMENTS

The following is a detailed description of example embodiments of the invention depicted in the accompanying drawings. The example embodiments are in such detail as to clearly communicate the invention. However, the amount of detail offered is not intended to limit the anticipated variations of embodiments, but on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Generally speaking, methods, systems, and media for processing and clearing a check are contemplated. Embodiments include hardware and/or software for generating an e-check in response to receipt of a paper check, by which a merchant performs the manual data entry for the merchant, the merchant's bank, the Federal Reserve Bank, and the purchaser's bank clearing procedures. The paper check is electronically scanned at the point of sale (POS) terminal to create a check object (the 'e-check') that contains the binary data of the check information and a scanned image of the paper check. Then, the e-check is submitted to the check writer's, or purchaser's bank, for automated clearing without having to process the physical document any further.

More specifically, the cashier simply verifies that the check is for the correct amount and enters the check amount as is customarily done. The cashier utilizes the POS terminal to scan the check to create an electronic image, and creates a binary check object that includes the processing information (bank name, routing info, check amount, check number, date, payee, the scanned check image, etc.). Thereafter, the e-check essentially takes the place of the paper check as the negotiable instrument. The e-check is sent directly to the purchaser's bank for clearing; the amount of the check is immediately deducted from the purchaser's account (or not, if there are insufficient funds), thereby eliminating the re-entry of the check information by the merchant's bank, clearinghouse, and purchaser's bank.

If the check clears, then the merchant's account is credited, and an acknowledgement is returned to the merchant by the merchant's bank. If the check is refused, the purchaser's bank notifies the merchant that the check has been refused. Thus, the merchant can tell immediately or almost immediately whether a check is good, and the funds have been deposited in the merchant's account, before releasing the goods, services, or cash.

In several embodiments, the paper check is returned to the purchaser by the cashier at the POS and is imprinted with a "cleared" indication, allowing the paper check to serve as a legal document to verify proof of payment. In other embodiments, the check may be forwarded to the purchaser's bank. Further embodiments are contemplated in which the user generates an e-check for purchasing merchandise or services from a merchant's web site on the Internet.

Figure 1:
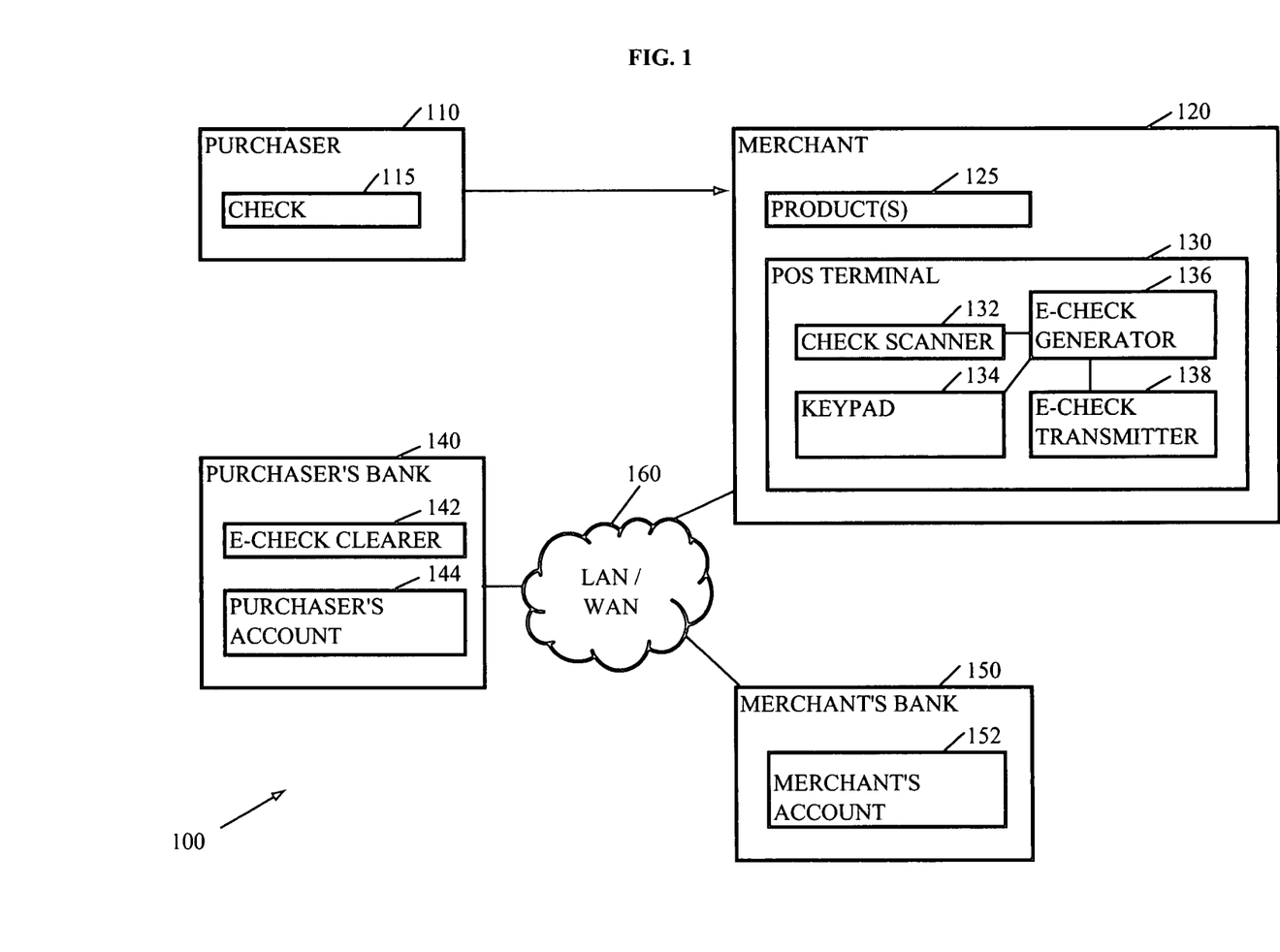
FIG. 1 depicts an embodiment of a system including a client computer system, email servers, and recipients coupled via a LAN and/or WAN to process and clear a check.

Turning now to the drawings, FIG. 1 depicts an embodiment of a system 100 to process and clear a check. More specifically, system 100 may include a purchaser 110, a merchant 120, a local area network and/or wide area network (LAN/WAN) 160, a purchaser's bank 140, and a merchant's bank 150. For example, purchaser 110 may include a customer that purchases a product(s) 125 from merchant 120 with a check 115. In other embodiments, purchaser 110 may include a customer and a computer that the customer uses to purchase a product from merchant 120. In such embodiments, purchaser 110 may transact with merchant 120 over the Internet, purchasing a product from the merchant via the merchant's web site and using an e-check instead of a paper check for payment.

Merchant 120 may include a seller and the seller's storefront. Merchant 120 may include the product(s) 125 and a point of sale (POS) terminal 130 such as a cash register. POS terminal 130 may be operated by a cashier and may include a check scanner 132, a keypad 134, an e-check generator 136, and an e-check transmitter 138. For instance, purchaser 110 may find the product(s) 125 in the store and bring the product(s) 125 to the cashier to check out. The cashier may operate the POS terminal to process the product(s) 125 and to process payment for the product(s) 125. Purchaser 110 may offer check 115 to the cashier as payment as well as identification so the cashier can verify the identity of purchaser 110. The cashier uses keypad 134 to enter the amount from check 115 into POS terminal 130. In further embodiments, POS terminal may include optical character recognition logic coupled with check scanner 132 to determine the amount written on check 115.

After the amount from check 115 is entered into POS terminal 130, check scanner 132 scans check 115 to generate a check image and read the routing number, account number and check number off check 115. For example, check scanner 132 may include an optical imaging system to generate a digital image from check 115 and a magnetic ink character recognition (MICR) system to read characters on checks inscribed with magnetic inks. In particular, paper checks are typically printed with magnetic inks to facilitate automated recording of the routing number, account number, and check number. If, for some reason, the check number, for instance, is not printed with a magnetic ink, the cashier may recognize the problem and enter the check number via keypad 134, or POS terminal 130 may utilize an optical character recognition system to read the numbers from check 115.

E-check generator 136 couples with check scanner 132 and keypad 134 to generate a check object, the e-check, based upon the information gathered from the check and information about the merchant's bank 150. For instance, POS terminal 130 may maintain or have access to data such as the routing number and account number for a merchant's account 152 associated with merchant 120 at merchant's bank 150. In some embodiments, the cashier may also have the ability to enter the merchant's banking information into POS terminal 130, e.g., via keypad 134 or another input device.

Figure 2:
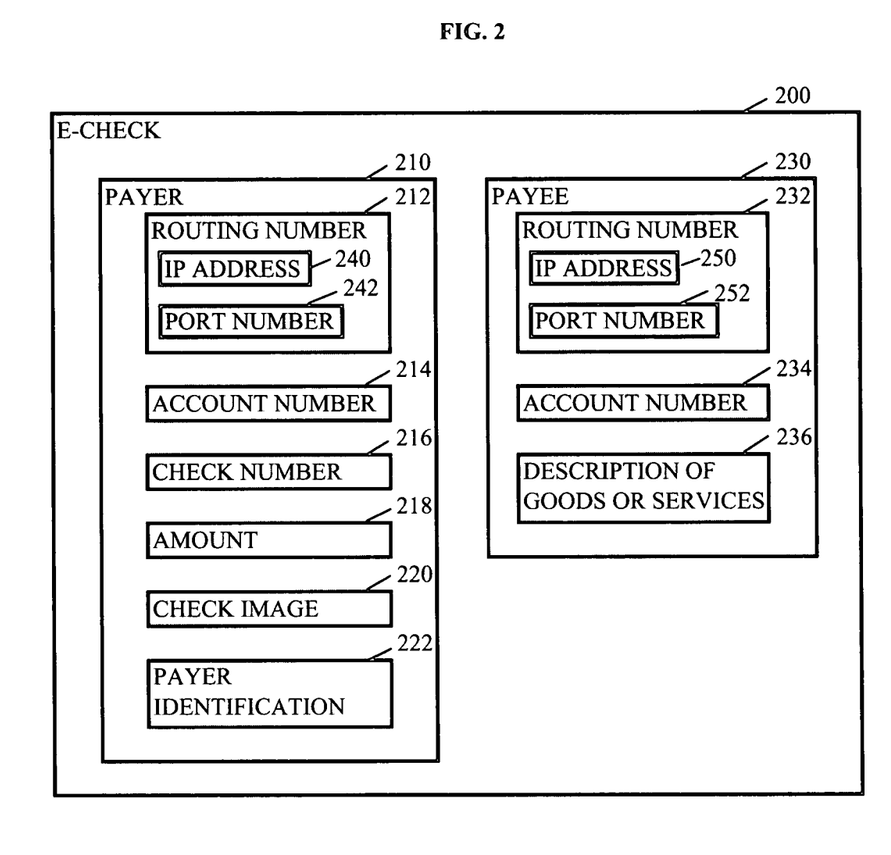
FIG. 2 depicts an embodiment of an e-check, or electronic check object.

Considering FIG. 2 in conjunction with FIG. 1, there is shown an example e-check 200. E-check 200 may include a digital file that includes the same or similar data as data included on a paper check. E-check 200 may include, e.g., payer 210 and payee 230. Payer 210 includes a routing number 212 that identifies the purchaser's bank 140, an account number 214 that identifies the purchaser's account 144 at the purchaser's bank 140 from which funds in an amount 218 may be withdrawn, a check number 216, the amount 218, and a check image 220. Routing number 212 may include an electronic address like an IP address 240 and a port number 242, determined from, e.g., a routing number table, to describe the electronic address for the purchaser's bank that is utilized for clearing checks. Further, check image 220 may include an image in a standard digital format such as Joint Photographic Experts Group (JPEG), Graphics Interchange Format (GIF), Tagged Image File Format (TIFF), Portable Network Graphics (PNG), or other graphics format. Thus, upon receipt and processing of e-check 200, purchaser's bank 140 may link check image 220 to a transaction described in an e-statement available for purchaser's account 144.

In further embodiments, payer 210 may include additional information like payer identification 222 to identify purchaser 110 for security such as the state and driver's license number of purchaser 110, the name of purchaser 110, and/or other identifying information. For instance, when purchaser 110 offers check 115 to the cashier, the cashier may request purchaser's driver license. Upon receiving the driver's license, the cashier may swipe a magnetic strip of the driver's license through a magnetic stripe reader, possibly built into POS terminal 130, to include the information in e-check 200. In some of these embodiments, the information can then be used to verify e-check transactions by purchaser's bank 140. In still further embodiments, purchaser 110 may provide a password or personal identification number (PIN).

Payee 230 may include information to identify the account to receive funds transferred from purchaser's account 140, or, in other words, merchant's account 152 from FIG. 1. Payee 230 may include data such as the merchant's routing number 232 and account number 234, as well as a description or list of goods or services 236 that are being exchanged for the funds represented by amount 218 from check 115. Similar to payer 210, routing number 232 may include IP address 250 and port number 252 to identify the electronic address associated with merchant's bank 150 that is designed for receiving funds electronically. Merchant's bank 150 may even receive a copy of check image 220 for a transaction record for merchant's bank 150 and/or merchant 120. In other embodiments, e-check 200 may only include the name of the payee 230, like a paper check.

E-check transmitter 138 may transmit the e-check to purchaser's bank 140 to request payment. In many embodiments, POS terminal 130 may transmit the e-check directly to purchaser's bank 140 for payment via LAN/WAN 160 and purchaser's bank 140 may transmit, e.g., by electronic funds transfer (EFT), the funds to merchant's account 152 via LAN/WAN 160. In further embodiments, POS terminal 130 may transmit the e-check to merchant's bank 150 and merchant's bank 150 may submit the e-check to purchaser's bank 140 for payment. For example, upon generation of an e-check for check 115, e-check transmitter 138 may associate an electronic address such as an Internet Protocol (IP) address with the e-check. In particular, e-check transmitter 138 may identify an IP address for purchaser's bank 140 based upon a payer's routing number such as routing number 212 and transmit the e-check to purchaser's bank 140 via LAN/WAN 160.

LAN/WAN 160 is a network connection to couple merchant 120 with purchaser's bank 140 to request payment of an e-check to merchant's bank 150 and to couple purchaser's bank 140 with merchant's bank 150 to transmit the payment based upon the e-check. In some embodiments, LAN/WAN 160 may include a network within a store or within a bank coupled via Ethernet, optical media like OptiConnect, or the like. In several embodiments, LAN/WAN 160 also couples with the Internet via a cable modem, a digital subscriber line (DSL), a T1 line, a T3 line, or the like. In further embodiments, LAN/WAN 160 may include a network of temporary connections such as connections via a telephone system.

Purchaser's bank 140 may include a bank or a computer system for a bank to process debits from purchaser's account 144. In particular, purchaser's bank 140 may include e-check clearer 142 and purchaser's account 144. Upon receiving an e-check from merchant 120 based upon a transaction involving check 115, e-check clearer 142 may verify the account number of purchaser's account 144 and compare the amount 218 to the balance of purchaser's account 144 to determine whether the transaction should be approved. In further embodiments, the check number may be compared with the check number of previously processed checks to verify that the same check 115 is not being processed again. In one embodiment, when additional information such as purchaser's driver license number, name, PIN and/or other identifying information is included in the e-check 200, e-check clearer 142 may compare that information with information associated with purchaser's account 144 to confirm authorization to access funds in the account.

Once e-check clearer 142 determines that the funds are available in purchaser's account 144, e-check clearer 142 may transmit a confirmation to POS terminal 130 and transfer the funds to merchant's account 152 via LAN/WAN 160. In other embodiments, purchaser's bank 140 may transfer the funds to merchant's account 152 and merchant's bank 150 may confirm the receipt of the funds with POS terminal 130.

Figure 3:
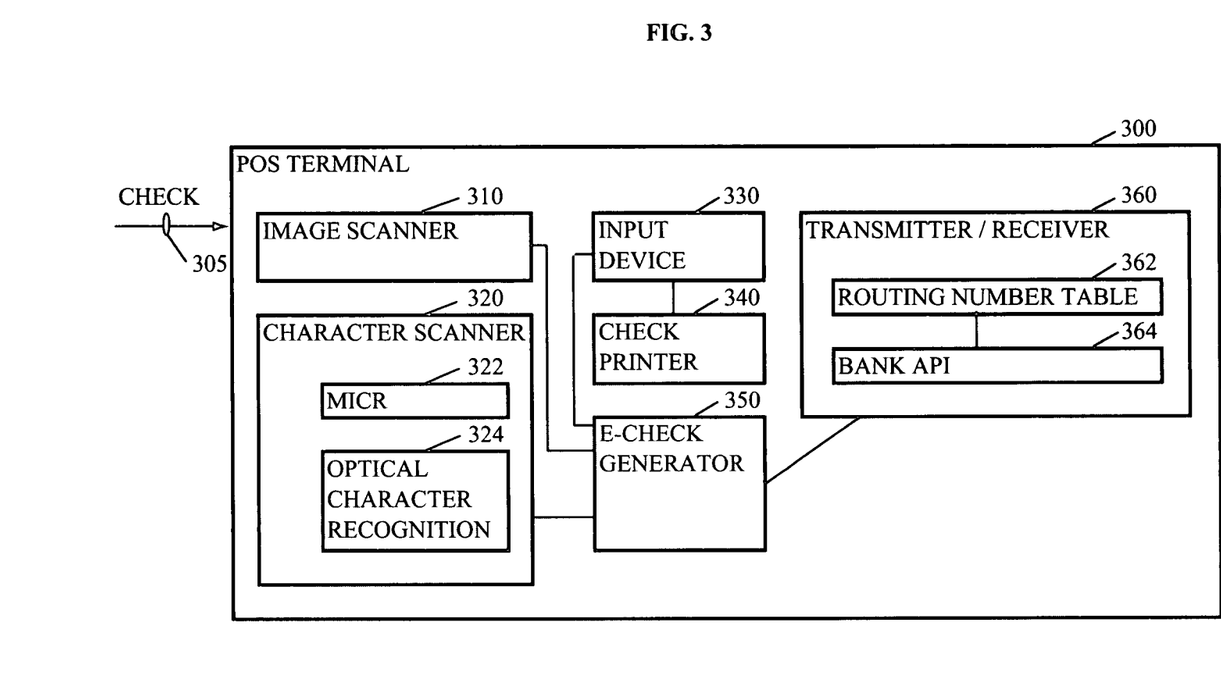
FIG. 3 depicts an embodiment of a point of service (POS) terminal to generate and process an e-check.

FIG. 3 depicts an embodiment of a POS terminal 300 to generate and process an e-check transaction. POS terminal 300 includes hardware and software adapted to generate the e-check based upon receipt of a check 305 and to transmit the e-check to a bank for payment based upon the routing number inscribed on check 305. POS terminal 300 may be any type of processor-based device like a desktop computer, a laptop, a PDA, or the like that can be adapted to generate and transmit an e-check. For example, POS terminal 300 may comprise a processor-based cash register at a department store. The cashier that operates the cash register may receive check 305 as payment for some merchandise and insert check 305 into POS terminal 300. Upon generating an e-check, POS terminal 300 may locate an IP address associated with the routing number of the purchaser's account and interact with the purchaser's bank via bank Application Program Interface (API) 364 to clear check 305. In other embodiments, POS terminal may interface with a second computer system that will facilitate clearance of check 305 by utilizing the corresponding e-check.

POS terminal 300 may include an image scanner 310, a character scanner 320, an input device 330, a check printer 340, an e-check generator 350, and a transmitter/receiver 360. Image scanner 310 may include optical sensors to create an electronic representation from check 305 that can be included in an e-check. The electronic representation may include an image file and may be transmitted to e-check generator 350.

Character scanner 320 may determine the routing number, account number and, possibly, the check number on check 305. More specifically, character scanner 320 may include magnetic sensors coupled with a MICR 322 to read magnetic ink used to print the routing number, account number, and check number on the check 305. In some embodiments, character scanner 320 may include logic that couples with the optical sensors of image scanner 310 such as optical character recognition 324 to determine the routing number, account number, and check number on the check 305. In such embodiments, optical character recognition 324 may also read the numbers from the check to determine the amount of currency represented by check 305.

Input device 330 may include a keypad and/or voice recognition logic to allow the cashier to enter the amount of currency check 305 represents and, in some embodiments, the check number, driver's license number, and/or other data. In further embodiments, input device 330 may include a private keypad that can be operated by the purchaser to privately enter a PIN and/or password to facilitate identification of the purchaser by the purchaser's bank.

Check printer 340 may be integral to a system including image scanner 310 and character scanner 320 to deface check 305 or print a record of the transaction on the check 305. For example, upon recording the data from the check, as well as the check image in an e-check, POS terminal 300 may deface check 305 so check 305 is no longer negotiable. The e-check then effectively or actually becomes the negotiable instrument, taking over the role from check 305.

E-check generator 350 may aggregate information from check 305 and the merchant to create a check object. In many embodiments, the check object may be assigned a unique identification number or code, which is similar to a check number in that it is used to distinguish between e-checks. The unique number or code may be substantially unalterable without corrupting the content of the check object and may be accessible by the purchaser's bank to determine whether the bank receives the e-check more than once. In such embodiments, the purchaser's bank may deny a transaction subsequently received with the same identification number or code. For example, the identification code may be based upon information contained within the e-check, a number associated with the date of the transaction.

Transmitter/receiver 360 may determine an electronic address to which to send the e-check based upon the routing number associated with the e-check and, in one embodiment, to interact with the purchaser's bank to process the transaction and determine whether the e-check is cleared. For instance, after the e-check is generated, transmitter/receiver 360 may look up the electronic address with which to communicate with the purchaser's bank via routing number table 362. Then, bank API 364 may be employed to interact with the bank. Bank API 364 may, for example, include one or more interfaces or rules for interfacing with a bank's computer system. Once establishing communication with the purchaser's bank, bank API can transmit the e-check to the bank and await clearance or denial of the transaction. In other embodiments, bank API 364 may transmit a request to clear the e-check along with the e-check to the purchaser's bank. Bank API 364 may then await a response to the request. In one embodiment, for example, bank API 364 transmits a request to transfer funds based upon the e-check to the purchaser's bank and assigns a unique identification to the transaction. The purchaser's bank clears the e-check and transfers the funds to the merchant's bank. The merchant's bank then transmits a receipt of funds confirmation associated with the unique transaction identification to POS terminal 300, confirming completion of the transaction to bank API 364. If the e-check did not clear, on the other hand, the purchaser's bank may transmit a reply to the funds transfer request back to bank API 364 possibly via the merchant's bank.

Figure 4:
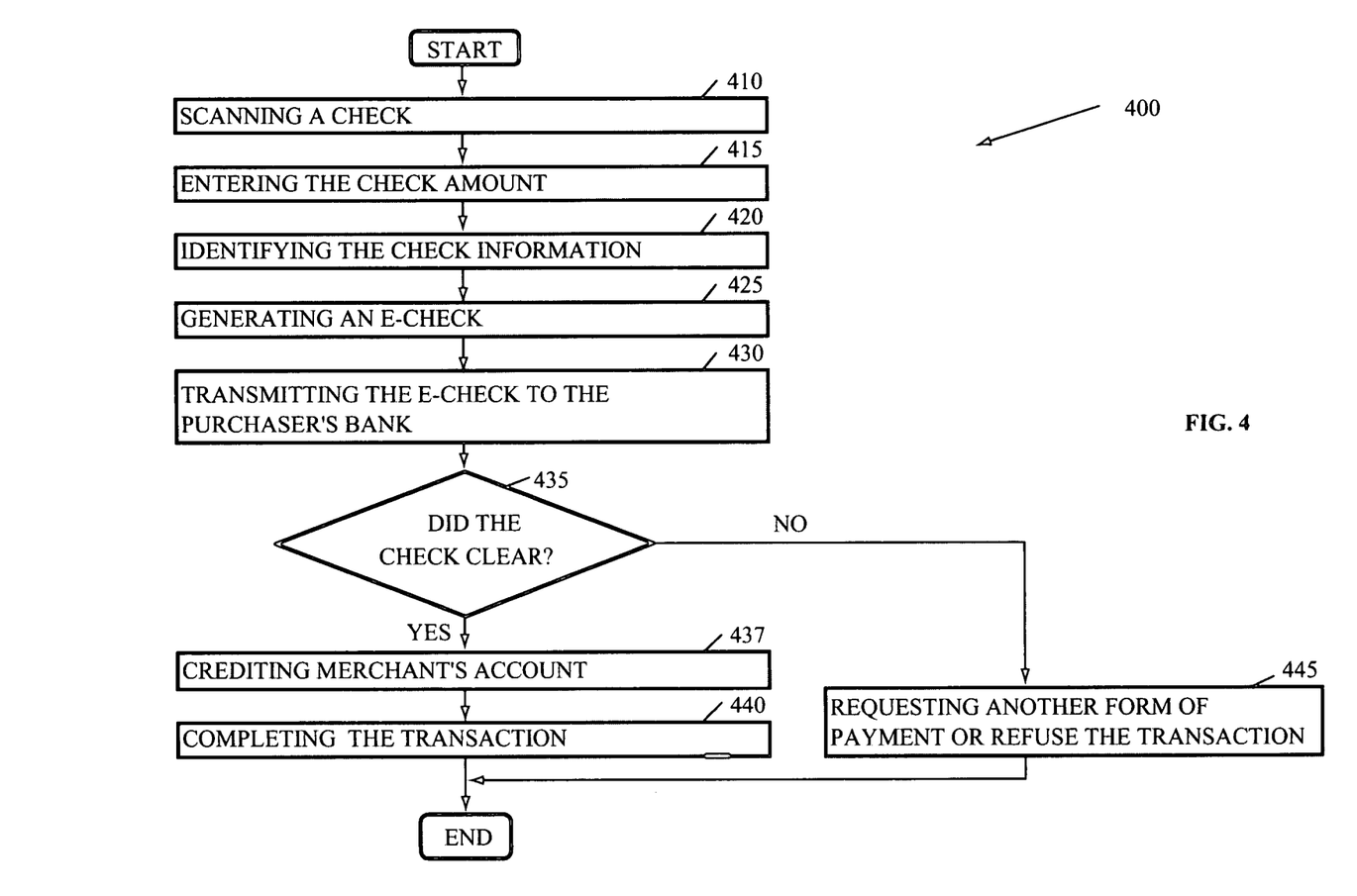
FIG. 4 depicts an example of a flow chart to process and clear a check.

Referring now to FIG. 4, there is shown an example of a flow chart 400 for processing and clearing a check. Flow chart 400 begins upon receipt of a paper check (element 410) for payment for a transaction between a purchaser and a merchant, such as purchaser 110 and merchant 120 in FIG. 1. In particular, the purchaser may write out a check from a checkbook, sign the check and hand the check to a cashier as payment for services, goods, and/or cash. The cashier may operate a POS terminal and enter the amount that the check is written out for into the POS terminal (element 415).

Once the cashier receives payment by check and verifies that the amount is correct, i.e. is consistent with the amount shown on the POS terminal, the check is scanned and a check object (e-check) is created electronically at the POS terminal. The POS terminal may be enhanced to allow scanning an image of the check in addition to reading the encoded (MICR) information on the check, identifying the check information (element 420). The POS terminal software is also enhanced to generate an electronic check object, or e-check (element 425), that contains as an attachment the true image copy of the check, and the data entered by the cashier. Thus, the physical check document does not need to be further processed by other parties and may be defaced and returned to the purchaser or forwarded to the purchaser's bank.

In some embodiments, the physical check may be held by the merchant for a predetermined period of time, or may be sent to the merchant's bank for routing to the purchaser's bank. If the check is to be returned to the purchaser, the amount of the check can be retrieved from the e-check and printed on the check. The ink utilized to the print the amount on the check wouldn't have to be MICR at this point because the amount is only printed on the paper check to let the purchaser compare the handwritten amount with the amount actually debited from the purchaser's account. Optionally, the amount of the check in the check object may be added to the scanned check image so that a hard copy of the image can be used as proof of payment.

The e-check, including the image attachment, can be submitted for instant clearing, or may be accumulated with the merchant's bank deposits for the day and transmitted to the purchaser's bank (element 430) at an appropriate time. In particular, the e-check is sent electronically, immediately to the purchaser's bank, using the bank's routing number scanned from the paper check and included in the e-check. The e-check may contain the complete transaction information such as the payee, amount, date, the purpose of the check such as a list or description of goods and/or services, etc. This information is obtained automatically, by the POS terminal. The purchaser's information is also included in the e-check by reading the information encoded on the check such as the name, address, check number, purchaser's bank routing information, etc.

After the e-check is transmitted to the purchaser's bank, the purchaser's bank either clears the check or denies payment (element 435) for reasons such as insufficient funds (NSF), stopped payment, etc. This information is routed back to the merchant if NSF or other denial, causing the cashier to request another form of payment from the purchaser or to refuse the transaction (element 445). On the other hand, the information is routed to the merchant's bank for credit to the merchant's account if the e-check is cleared (element 437).

The merchant's bank acknowledges the credit to the merchant's account by notifying the cashier at the POS terminal and the cashier completes the transaction (element 440) by providing the merchandise, services, and/or cash to the purchaser. The purchaser's account may then be immediately debited and merchant's account is immediately credited. Thus, the merchant may know immediately whether the check is good, cleared, and the funds have been deposited in the merchant's account, before releasing the merchandise, services or cash. In one embodiment, when a paper check is not returned to the purchaser upon clearance, the merchant later sends the paper check along with other paper checks to the merchant's bank where the checks are sorted and sent to the proper banks.

One embodiment of the invention is implemented as a program product for use with a computer system such as, for example, the system 100 shown in FIG. 1. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., hard-disk drive or floppy disk within a diskette drive); and (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

It will be apparent to those skilled in the art having the benefit of this disclosure that the present invention contemplates methods, systems, and media to process and clear a check. It is understood that the form of the invention shown and described in the detailed description and the drawings are to be taken merely as examples. It is intended that the following claims be interpreted broadly to embrace all the variations of the example embodiments disclosed.

What is claimed is:

1. A method for generating an e-check, the method comprising:
    scanning a check to create an image of the check in response to receiving the check as payment for a transaction;
    entering an amount of currency represented by the check into a point of sale terminal;
    identifying check information that describes a bank and a bank account, wherein the check comprises the check information; and
    generating a negotiable instrument, wherein the negotiable instrument comprises the e-check based upon the image, the amount, and the check information, wherein further the e-check includes the image and an Internet Protocol (IP) address of a payer and an IP address of a payee, and wherein the e-check includes a port number of the IP address of the payer and a port number of the IP address of the payee, wherein further the e-check is in an electronic format capable of being transferred electronically.

2. The method of claim 1, further comprising printing the amount on the check.

3. The method of claim 1, wherein scanning the check comprises scanning the check at the point of sale terminal.

4. The method of claim 1, wherein entering the amount comprises communicating the amount represented by the check to the point of sale terminal.

5. The method of claim 1, wherein identifying the check information comprises determining a routing number, an account number, and a check number.

6. The method of claim 5, wherein generating the e-check comprises creating the e-check with at least the image, the routing number, the account number, and the amount.

7. The method of claim 1, wherein generating the e-check comprises creating the e-check with data, wherein the data is to verify an identification of a check writer.

8. The method of claim 1, wherein identifying the check information comprises implementing magnetic ink character recognition to read the check information from the check.

9. A method for transacting with an e-check, the method comprising:
    generating the e-check based upon an image of a check, to substitute for a check as payment for a transaction, wherein the e-check includes the image, wherein further the e-check includes an Internet Protocol (IP) address of a payer and an IP address of a payee, and wherein the e-check includes a port number of the IP address of the payer and a port number of the IP address of the payee, wherein further the e-check is negotiable and in an electronic format capable of being transferred electronically;
    transmitting the c-check to a bank, wherein the bank is identified by a routing number on the check; and
    receiving a response to transmission of the e-check from the bank, the response to clear the check when sufficient funds are available for the transaction from an account associated with the e-check.

10. The method of claim 9, wherein generating the e-check comprises generating the e-check at the point of sale terminal.

11. The method of claim 9, wherein transmitting the e-check comprises identifying an electronic address using the routing number.

12. The method of claim 11, wherein transmitting the e-check further comprises transmitting the e-check to the electronic address over a network.

13. The method of claim 9, wherein the e-check comprises a unique e-check identification number.

14. The method of claim 9, wherein transmitting the e-check comprises transmitting a request to transfer an amount associated with the e-check to an account associated with a merchant.

15. The method of claim 14, wherein receiving the response comprises receiving an indication that the amount is credited to the account associated with the merchant.

16. The method of claim 14, wherein receiving the response comprises receiving a denial for the request to transfer the amount.

17. An apparatus for generating an e-check, the apparatus comprises:
- an image scanner to create an image of a check in response to receiving the check as payment for a transaction;
- an input device to input an amount of currency represented by the check;
- a character scanner to scan the check to identify check information that describes a bank and a bank account, wherein the check information comprises a bank routing number;
- a routing number table to provide lookup of the bank routing number and return an Internet Protocol (IP) address and port number of the payer; and
- an e-check generator to generate a negotiable instrument, wherein the negotiable instrument comprises the e-check based upon the image, the amount, and the check information, wherein further the e-check includes the image and the IP address and port number of the payer, wherein further the e-check is in an electronic format capable of being transferred electronically.

18. The apparatus of claim 17, further comprising a printer to print the amount on the check as a receipt for the customer.

19. The apparatus of claim 17, wherein the image scanner is adapted to scan the check at a point of sale.

20. The apparatus of claim 17, wherein the input device comprises a keypad to type the amount represented by the check.

21. The apparatus of claim 17, wherein the character scanner comprises magnetic ink character recognition to determine a routing number associated with the bank, an account number associated with the bank account, and a check number associated with the check.

22. The apparatus of claim 17, wherein the e-check generator is adapted to create the check object with at least the image, the routing number, the account number, and the amount.

23. A tangible machine-accessible medium containing instructions, which when executed by a machine, cause said machine to perform operations, comprising:
- scanning a check to create an image of the check in response to receiving a check as payment for a transaction;
- entering an amount of currency represented by the check into a point of sale terminal;
- identifying check information that describes a bank and a bank account, wherein the check comprises the check information, wherein the check information comprises a bank routing number;
- look up of the bank routing number in a routing number table to obtain an Internet Protocol (IP) address and port number of the payer; and
- generating a negotiable instrument, wherein the negotiable instrument comprises an e-check based upon the image, the amount, and the check information, wherein further the check object includes the image and the IP address and port number of the payer, wherein further the e-check is in an electronic format capable of being transferred electronically.

24. The machine-accessible medium of claim 23 wherein the operations further comprise printing the amount on the check.

25. The machine-accessible medium of claim 23, wherein scanning the check comprises scanning the check at a point of sale terminal.

26. The machine-accessible medium of claim 23, wherein entering the amount on the check comprises communicating the amount represented by the check to the point of sale terminal.

27. The machine-accessible medium of claim 23, wherein identifying the check information comprises determining a routing number, an account number, and a check number.

28. The machine-accessible medium of claim 27, wherein generating the check object comprises creating the check object with at least the image, the routing number, the account number, and the amount.

29. The machine-accessible medium of claim 23, wherein identifying the check information comprises implementing magnetic ink character recognition to read the check information.

30. The method of claim 1, further comprising receiving, via the point of sale terminal, a personal identification number (PIN) and a driver license number;
- wherein the scanning comprises scanning at the point of sale terminal;
- wherein further the image of the check is in a Joint Photographic Experts Group (JPEG) format;
- wherein further the identifying check information comprises reading, via a magnetic ink character recognition (MICR) system, a routing number, the bank account, and a check number;
- wherein the check object that includes the routing number, the account number, the check number, and an e-check identification number;
- wherein further the e-check identification number is to distinguish the e-check from other e-checks.

* * * * *